United States Patent [19]
Colquhoun et al.

[11] Patent Number: 5,698,105
[45] Date of Patent: Dec. 16, 1997

[54] POLYMER POROUS STRUCTURE AND PROCESS

[75] Inventors: Howard Matthew Colquhoun, Knutsford; Peter John Williams, Frodsham; Andrew Lennard Lewis, Ponciau, all of United Kingdom

[73] Assignee: North West Water Group PLC, United Kingdom

[21] Appl. No.: 505,201

[22] PCT Filed: Feb. 2, 1994

[86] PCT No.: PCT/GB94/00198

§ 371 Date: Oct. 11, 1995

§ 102(e) Date: Oct. 11, 1995

[87] PCT Pub. No.: WO94/17905

PCT Pub. Date: Aug. 18, 1994

[30] Foreign Application Priority Data

Feb. 2, 1993 [GB] United Kingdom ............ 9302035
  Mar. 31, 1993 [GB] United Kingdom ............ 9306761

[51] Int. Cl.[6] .................................. B01D 61/00
[52] U.S. Cl. .................. 210/652; 210/654; 210/490; 210/500.41; 210/500.27; 264/45.1; 427/245
[58] Field of Search ............... 210/490, 652, 210/500.38, 500.42, 500.27, 500.35, 500.41, 500.29, 500.4, 500.25, 654; 264/45.1, 48, 49; 427/245

[56] References Cited

U.S. PATENT DOCUMENTS

| | | | |
|---|---|---|---|
| 4,559,139 | 12/1985 | Uemura et al. | 210/490 |
| 4,758,343 | 7/1988 | Sasaki et al. | 210/500.38 |
| 4,834,886 | 5/1989 | Cadotte | 210/40 |
| 4,895,661 | 1/1990 | Cadotte | 210/490 |

FOREIGN PATENT DOCUMENTS

| | | |
|---|---|---|
| 0047953 | 12/1982 | European Pat. Off. . |
| 0228248 | 7/1987 | European Pat. Off. . |
| 0442557 | 8/1991 | European Pat. Off. . |
| 2371477 | 4/1976 | France . |

*Primary Examiner*—Ana Fortuna
*Attorney, Agent, or Firm*—Michael, Best & Friedrich

[57] ABSTRACT

A reverse osmosis membrane having a support which itself has properties of salt rejection laminated to a layer of a cross-linked polyol. The support is a sulphonated aromatic polyether sulphone, and the polyol ma be polyvinyl alcohol.

27 Claims, No Drawings

POLYMER POROUS STRUCTURE AND PROCESS

This invention relates to a novel class of polymer membranes, particularly to a structure having high flux and salt rejection, which can be used to advantage in reverse osmosis, and to a process for the construction of such a membrane.

Reverse osmosis membranes, whether integral asymmetric or composite in structure, are known, e.g. those comprising a layer of a sulphonated polysulphone active material, and the latter often have an acceptable performance in terms of water flux and rejection of dissolved salts, the active material providing the good salt rejection and having good chemical stability, e.g. chlorine-, pH- and heat-resistance. However, in general, both the flux and salt rejection of such membranes, represent a compromise level of performance, which is no more than acceptable. Thus, if the water flux of such membranes is at a commercially viable level of performance, the salt rejection is at a level of performance which is merely 'average' and vice versa. This means that such membranes can in practice only be used in the reverse osmosis (i.e. in e.g. desalination) of feedwaters with a relatively low salt content, or with the additional cost of recycling any feedwater with a higher salt content.

There is clearly a need for a reverse osmosis membrane with a structure having high flux and an active material having good salt rejection and chemical stability, the performance of which in both aspects is appreciably better than that of known membranes which have good chemical stability, e.g. those comprising a layer of a sulphonated polysulphone.

By 'appreciably better' herein we mean that the salt transmission is less than 40% of the value for the corresponding known membrane, whilst the water flux is in excess of 40% of the value for the corresponding known membrane. Preferably, the salt transmission is less than 30%, in particular less than 20%, of the value for the corresponding known membrane, whilst the water flux is preferably in excess of 50%, in particular more than 60%, of the value for the known membrane.

We have now obtained high performance reverse osmosis membranes of this type, in which we have for the first time been able to select a flux level also providing good salt rejection.

Accordingly, the present invention provides a reverse osmosis membrane comprising a support membrane which itself has properties of salt rejection laminated to a layer comprising a cross-linked optionally protected polyol.

Such membranes may be used in the reverse osmosis (i.e. desalination) of feedwaters with a relatively high salt content, with minimisation of the cost of recycling any such feedwater with a higher salt content.

The support membrane is one which (in the absence of the layer of cross-linked optionally protected polyol) has salt rejection properties. This support membrane is preferably a reverse osmosis membrane but may be a nanofiltration membrane.

The membranes of the invention may be classed as composite membranes by virtue of their construction which incorporates the support membrane (which itself has salt rejection properties) and the cross-linked polyol layer laminated thereto. The support membrane may, for example, be an integral asymmetric membrane. It is however more preferred that the support membrane is itself a composite membrane (referred to herein as a composite support membrane to distinguish it form the membranes of the invention).

The composite support membrane may for example comprise a layer providing a degree of salt rejection laminated to an ultrafiltration support membrane. Membranes in accordance with the invention comprising a composite support membrane and a layer of cross-linked polyol are referred to herein as multi-layer composite membranes.

Preferably the polyol has a weight average molecular weight of 500 to 500,000.

The polyol in any membrane of the present invention will often be cross-linked by means of an active cross-linking agent.

The cross-linking agent may be any species which is capable of reacting with the polyol hydroxyl functions intermolecularly, e.g. an organic compound having a reactive carbonyl group or a precursor thereof which is capable of so reaction. Such compounds include aliphatic aldehydes and ketones, e.g. formaldehyde or butyraldehyde, which react with the polyol hydroxyl functions, in the presence of a strong acid, by acetal formation.

The polyol in the membrane of the present invention is thus believed (without prejudice to the present invention as claimed) in such cases to be cross-linked by hydrocarbylenedioxy groups.

The polyol in any membrane of the present invention will often be protected conventionally. The protecting agent may be any species which is capable of reacting with the polyol hydroxyl functions intermolecularly, e.g. an organic compound having a reactive group, e.g. a carbonyl group or a precursor thereof which is capable of so reaction. Such compounds include oxoalkanes, such as aliphatic aldehydes and ketones, e.g. formaldehyde or butyraldehyde which can react with the polyol, in the presence of a strong acid, by acetal formation.

The polyol in the membrane of the present invention is thus believed (without prejudice to the present invention as claimed) in such cases to be protected in part by hydrocarbylendioxy groups replacing pairs of hydroxyl functions.

From the foregoing, it will be seen that the polyol component of the present membrane may be cross-linked and optionally protected by a single agent for cross-linking and protecting the polyol, which may be one having a reactive carbonyl group or a precursor thereof which is capable of reacting with and linking pairs of hydroxyl functions.

All materials for the support membrane should of course a) have adequate resistance to their chemical environment in the process in which the reverse osmosis membrane of the invention is to be used, and b) not be prone to fouling in that environment.

Any material may be used in the support membrane of the present invention provided that it has an adequate stability for its intended use; preferably it has a high chemical stability, so that its performance is not appreciably affected by the nature of any impurities, such as chlorine, acid or alkali, in, or the temperature of, the feedwater.

Materials for such support membranes include those known as SPEES/PES (i.e. sulphonated poly(ether ether sulphone)/poly(ether) sulphone)) and SPEDES/PES (i.e. sulphonated poly(ether diphenyl ether sulphone)/poly(ether sulphone)). SPEES/PES are each based respectively on a copolymer of a unit of formula I or II.

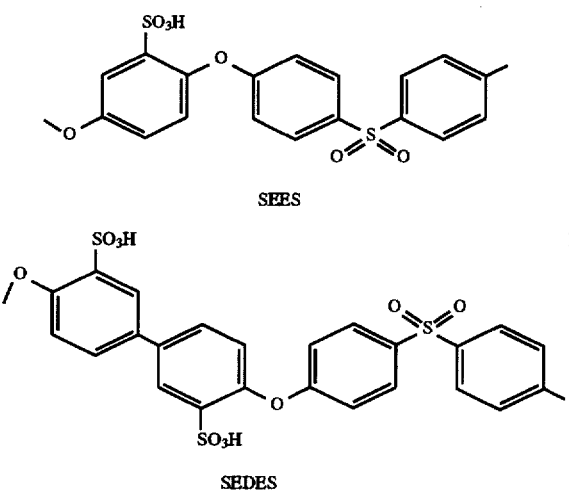

SEES

SEDES with a unit represented by the following formula III:

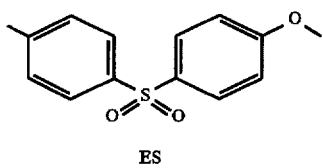

ES if the polymer is SPEDES/PES then the preferred molar ratio range of ES:SEDES is 1:1 to 20:1, e.g. 2:1 to 12:1 (e.g. 2:1 to 10:1), in particular 3:1 to 8:1.

If the polymer is SPEES/PES then the preferred molar ratio range for ES:SEES is 1:2 to 10:1 (in particular 1:1 to 5:1).

Each such sulphonated unit is hereinafter referred to for convenience by the trivial name appended to it above.

These materials have a good chemical stability, e.g. chlorine-, pH- and heat-resistance, and are also advantageous in other aspects.

These are especially advantageous in that the initial unsulphonated polymeric precursor of the sulphonated polymer is easily obtained by polycondensation of hydroquinone or 4,4-biphenol, 4,4'-dihydroxydiphenylsuphone and 4,4'-dichlorodiphenylsulphone.

These polymeric precursors are also advantageous in that they are rapidly, selectively and quantitatively sulphonated only on the dioxydiphenylene or dioxyphenylene residue at the positions shown with no degree of molecular weight degradation during sulphonation.

The degree of sulphonation, and hence the level of hydrophilicity, of the final polymer is readily predetermined by the molar ratio of the SEDES or SEES to ES.

Any SPEDES/PES and SPEES/PES material which has a composition within the range given hereinbefore, and can give the required good salt rejection may be used in the support layer of the reverse osmosis membranes of the present invention.

Preferred reverse osmosis membranes of the present invention have, however, in addition to high chemical stability, a performance which has not only appreciably better as defined hereinbefore, but exhibit the levels of performance values identified as preferred.

These properties are largely determined by the composition of the SPEDES/PES or SPEES/PES polymer.

Accordingly, in a preferred embodiment, the present invention provides a reverse osmosis membrane in which the active layer (i.e. the support layer) comprises a SPEDES/PES polymer, in which the molar ratio of the SEDES and ES units are in the ranges of ES:SEDES of 2:1 to 12:1, in particular 3:1 to 8:1.

Alternatively, the support layer may comprise a SPEES/PES polymer in which the molar ratio of the SEES and ES units are in the ranges of ES:SEES 1:2 to 10:1, in particular 1:1 to 5:1.

These anionic materials of the active layer of the present invention will of course contain a counterion.

This may be any cation, but is usually a hydrogen cation, or an alkali metal cation, such as sodium or potassium.

Further examples of polymers which may be used as the active layer are those incorporating subunits of the formula (IV)

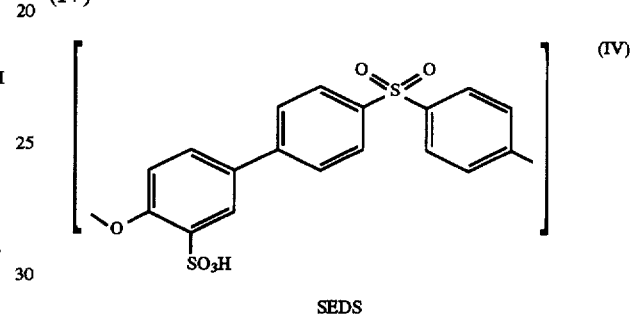

SEDS either alone or in combination with units of the formula (III) (see above)

Such polymers may be prepared by polycondensation or copolycondensation (as the case may be) of 4-(4-chlorophenylsulphonyl)-4'-hydroxydiphenyl for which a synthesis is described in Polymer 1977, Vol 18, April, pages 354 et seq. The resultant polymer is then sulphonated. Copolymers containing units (IV) and (III) are referred to herein as SPEDS/PES.

In the membrane of the present invention, other suitable materials for the support (i.e. active) layer include polyamides, such as unsaturated aromatic polyamides are araliphatic polyamides, polyureas, polyimides, such as unsaturated aromatic and araliphatic polyimides, polyaroazoles and polyarodiazoles, such as polybenzimidazole, polyhydrazides, polyesters, cellulosics, such as cellulose diacetate and triacetate, and anion-substituted polyacrylics and polyvinylics.

Accordingly, in another embodiment the present invention provides a reverse osmosis membrane in which the support (active) layer comprises a cross-linked polyamide, polyamide, polyaroazole or polyarodiazole which is laminated to the layer of cross-linked optionally protected polyol.

One class of such active materials in the membrane include a cross-linked aromatic polyamide containing monomer units approximately represented by the following formula V:

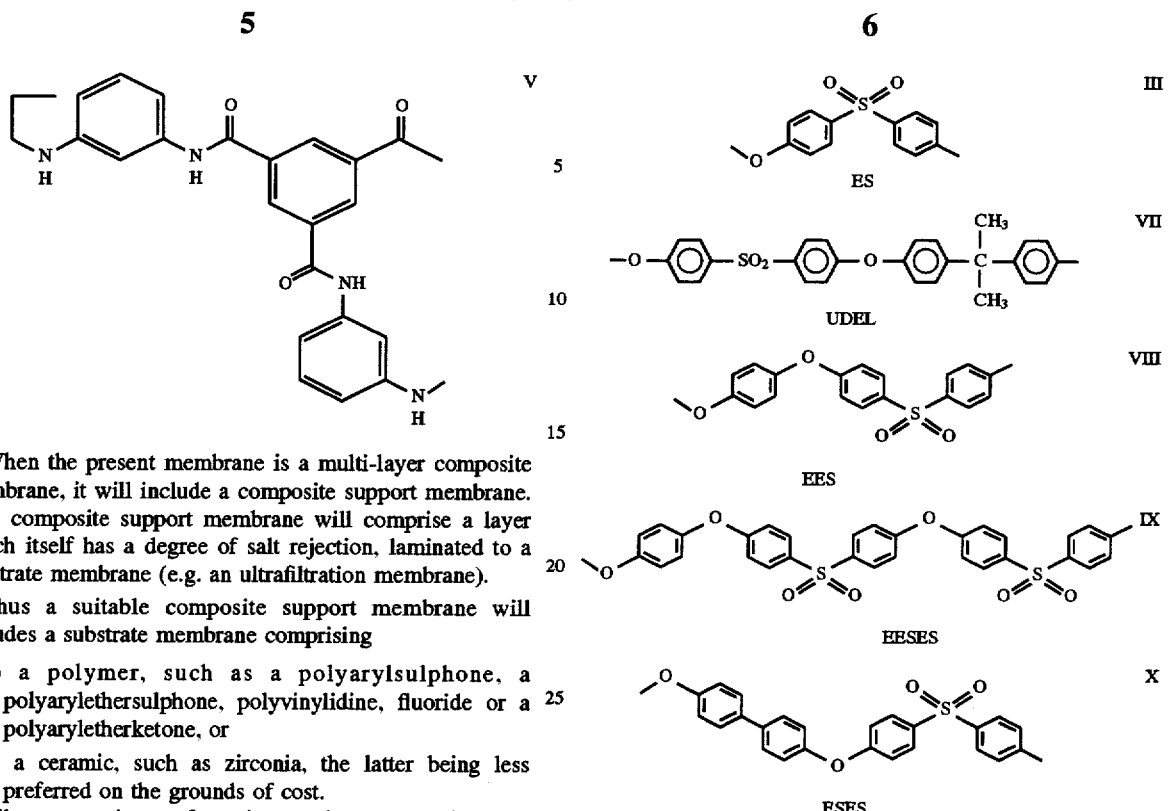

When the present membrane is a multi-layer composite membrane, it will include a composite support membrane. This composite support membrane will comprise a layer which itself has a degree of salt rejection, laminated to a substrate membrane (e.g. an ultrafiltration membrane).

Thus a suitable composite support membrane will includes a substrate membrane comprising a) a polymer, such as a polyarylsulphone, a polyarylethersulphone, polyvinylidine, fluoride or a polyaryletherketone, or b) a ceramic, such as zirconia, the latter being less preferred on the grounds of cost.

Where, as is preferred a polymer, such as a polyarylsulphone, a polyarylethersulphone, a poly(etherimide), a polyvinylidine fluoride or a polyaryletherketone, is used as the substrate membrane, the support membrane will often also comprise a reinforcement of a material which is also not appreciably affected by the nature of any impurities, such as chlorine, acid or alkali, in, or the temperature of, the feedwater.

It may be e.g. a conventional cloth backing sheet of a material such as polypropylene or polyester with high chemical resistance, on which the polymer of the substrate membrane, such as a polyarylsulphone, a polyarylethersulphone, polyvinylidine fluoride or a polyaryletherketone, is present as a coating.

Polysulphone-based substrate membranes are particularly preferred for their high chemical resistance, e.g. those of the polysulphone UDEL or the polyarylethersulphone PES (see below).

The substrate membrane should preferably have an effective pore size in the range of 50 Å to 50,000Å, in particular 500Å to 5000Å.

such substrate membranes should have a pure water permeability of 0.033 to 3.3 m/day at 1 bar, e.g. 0.1 to 1.0 m/day at 1 bar.

Where the multilayer composite membrane of the invention also comprises a reinforcement in the form of a backing sheet which bears a layer of a polymer, such as a polyarylsulphone, a polyarylethersulphone, a poly(etherimide), a polyvinylidine fluoride or a polyaryletherketone, the latter will often have a thickness in the range of 20 μ to 250 μ, in particular 30 μ to 100 μ.

Multi-layer composite membranes including a backing sheet should have a total thickness in the ranges of 50 μ to 500 μ, in particular 100 μ to 250 μ.

As examples of polymers of which the substrate membrane may be made are inter alia polymers and copolymers of units of the general formulae III and VI–XII.

The polymer is preferably a homopolymer e.g. UDEL or PES.

However, we do not exclude the possibility that it may be a copolymer e.g. PEES/PES, or a polyetherketone such as one wherein the comonomer units are represented by the following formulae:

Each such polymer type is hereinafter referred to for convenience by the trivial name appended to it above.

The present invention also provides a process for the preparation of a reverse osmosis membrane, comprising the steps of a) coating a surface of a membrane which itself has salt rejection properties or a component layer thereof with a solution comprising a polyol, b) cross-linking the polyol, and c) as necessary polymerising and/or protecting the polyol.

In a preferred embodiment, a1) the polyol in the coating solution is polymeric, and b1) cross-linking the polyol and protection thereof as necessary, is effected by a single component of the coating solution.

In step a1, the polymeric polyol may be a polymer having repeating units formally derived from a polymerised unsaturated lower alcohol. The preferred polyol is polyvinyl alcohol.

The single component of the coating solution for cross-linking and optionally protecting the polyol may be an organic compound having a reactive carbonyl group or a precursor thereof which is capable of reacting with the polyol alcohol functions.

Compounds having a reactive carbonyl group or a precursor thereof which is capable of reacting in this way include aliphatic aldehydes and ketones, e.g. formaldehyde or butyraldehyde, in the presence of a strong acid.

Where the compound which has a group or a precursor thereof which is capable of reacting with the polyol alcohol functions is an aldehyde or ketone in the presence of a strong acid, the strong acid may be sulphuric acid, phosphoric acid or a sulphonic acid.

The support membrane is preferably a reverse osmosis membrane but may for example be a nanofiltration membrane. If the support membrane is itself a composite support membrane then the process of the invention comprises coating the surface of the active layer thereof.

Typically, the coating solution is applied as a thin film and the solvent is subsequently removed.

In the preferred embodiment, this is typically effected at a temperature between 20° and 80° C., which, it is believed, simultaneously cross-links some of the polyol alcohol functions intermolecularly and links and protects some of the polyol alcohol functions intramolecularly, in both cases by acetal formation, giving rise to a reverse osmosis membrane of the present invention.

The solvent in the coating solution, which is removed after coating, should (especially in the preferred embodiment) be chosen so that the surface of the reverse osmosis (optionally composite) membrane which is coated is not unduly attacked or swollen (and preferably is unaffected) by the solvent at the temperature at which a) the surface is coated and/or
b) the solvent is removed.

The solvent may thus often conveniently consist mainly of water and/or a lower alcohol, provided that the same is compatible with any agent e.g. organic compound for cross-linking and optionally protecting the polyol functional groups in the product membrane.

The present invention will now be illustrated by the following Examples:

Example 1

A composite reverse osmosis membrane comprising a selective layer of a SPEES/ES (1:3 molar ratio) copolymer (i.e. of a monomer of formula I with a comonomer of the formula III in the molar ratio of 1:3), laminated to a polysulphone ultrafiltration support-membrane was coated with a 1 wt % aqueous solution of polyvinyl alcohol (65,000 MW (weight average), 100% hydrolysed) containing 1 wt % sulphuric acid and 4 wt % formaldehyde using a continuous bead-coater.

The resulting coated membrane was dried at 40° C. and tested in reverse osmosis using 0.2% sodium chloride solution at 40 bar pressure.

The results were as follows:

|  | Flux (GFD) | Salt Rejection % | Salt Transmission % |
| --- | --- | --- | --- |
| Before | 49.3 | 96.4 | 3.6 |
| After | 36.2 | 99.1 | 0.9 |
| % Original | 73.4% |  | 25.0% |

Example 2

A composite reverse osmosis membrane comprising a selective layer of SPEDES/ES (1:6 molar ratio) copolymer (i.e. of a monomer of formula II with a comonomer of the formula III in the molar ratio of 1:6), laminated to a polysulphone ultrafiltration support-membrane was coated with a 1 wt % aqueous solution of polyvinyl alcohol (65,000 MW (weight average), 100% hydrolysed) containing 1 wt % sulphuric acid and 4 wt % formaldehyde using a continuous bead-coater.

The resulting coated membrane was dried at 40° C. and tested in reverse osmosis using 0.2% sodium chloride solution at 40 bar pressure.

The results were as follows:

|  | Flux (GFD) | Salt Rejection % | Salt Transmission % |
| --- | --- | --- | --- |
| Before | 104.0 | 89.4 | 10.6 |
| After | 64.0 | 97.0 | 3.0 |
| % Original | 62.0% |  | 28.0% |

Example 3

A commercially available composite reverse osmosis membrane (Filmtec FT-30), comprising a selective layer of polymer of the formula V laminated to a polysulphone ultrafiltration support-membrane, was coated with a 1 wt % aqueous solution of polyvinyl alcohol (65,000 MW (weight average), 100% hydrolysed) containing 1 wt % sulphuric acid and 4 wt % formaldehyde using a continuous bead-coater.

The resulting coated membrane was dried at 40° C. and tested in reverse osmosis using 0.2% sodium chloride solution at 40 bar pressure.

The results were as follows:

|  | Flux (GFD) | Salt Rejection % | Salt Transmission % |
| --- | --- | --- | --- |
| Before | 69.4 | 97.6 | 2.4 |
| After | 39.1 | 99.6 | 0.4 |
| % Original | 56.3% |  | 16.7% |

Example 4

A composite reverse osmosis membrane comprising a selective layer of SPEDS/PES (1:3 mole ratio), laminated to a polysulphone ultrafiltration support membrane was coated with a 1 wt % aqueous solution of polyvinyl alcohol (65,000 MW (weight average), 100% hydrolysed) containing 1 wt % sulphuric acid and 4 wt % formaldehyde using a continuous bead-coater. The resulting coated membrane was dried at 50° C. and tested in reverse osmosis using 0.2% sodium chloride solution at 40 bar pressure. The results before and after coating were as follows:

|  | Flux (GFD) | Salt Rejection % | Salt Transmission % |
| --- | --- | --- | --- |
| Before | 62.2 | 95.9 | 4.1 |
| After | 26.7 | 99.5 | 0.5 |
| % Original | 42.9% |  | 12.2% |

We claim:

1. A reverse osmosis membrane comprising a sulphonated aromatic polyether sulphone support membrane which itself has properties of salt rejection laminated to a layer comprising a polyol, said polyol being crossed-linked by one of formaldehyde, precursors of formaldehyde, and mixtures thereof which react with hydroxyl groups of said polyol and crosslink said polyol.

2. A membrane as claimed in claim 1 wherein the polyol has a weight average molecular weight of 500 to 500,000.

3. A membrane as claimed in claim 2 wherein the polyol is a polymer having repeating units formally derived from a polymerised lower unsaturated alcohol.

4. A membrane as claimed in claim 2 wherein the polyol is polyvinyl alcohol.

5. A membrane as claimed in claim 4 wherein said support membrane comprises SPEDS or SPEDS/PES.

6. A membrane as claimed in claim 1 wherein the support membrane comprises SPEES/PES or SPEDES/PES.

7. A membrane as claimed in claim 6 wherein the support membrane comprises SPEDES/PES and the molar ratio of ES:SEDES is in the range 1:1 to 20:1.

8. A membrane as claimed in claim 7 wherein said molar ratio range is 2:1 to 12:1.

9. A membrane as claimed in claim 8 wherein said molar ratio range is 3:1 to 8:1.

10. A membrane as claimed in claim 6 wherein the support membrane comprises SPEES/PES and the molar ratio of ES:SEES is in the range 1:2 to 10:1.

11. A membrane as claimed in claim 10 wherein said molar ratio range is 1:1 to 5:1.

12. A multi-layer composite membrane comprises a reverse osmosis membrane as claimed in claim 1 wherein said membrane is associated with a porous substrate membrane.

13. A multi-layer composite membrane as claimed in claim 12 wherein the substrate membrane has a pore size in the range 50 Å to 50,000 Å.

14. A multi-layer composite membrane as claimed in claim 10 wherein the substrate membrane has a pore size in the range 500 Å to 5000 Å.

15. A multi-layer composite membrane as claimed in claim 12 having a total thickness in the range 50 μ to 500 μ.

16. A multi-layer composite membrane as claimed in claim 15 having a total thickness of 100 μ to 250 μ.

17. A multi-layer composite membrane as claimed in claim 12 wherein the substrate membrane comprises a polymer or a ceramic.

18. A multi-layer composite membrane as claimed in claim 17 wherein the substrate membrane is a polyarylsulphone, a polyarylethersulphone, a poly(etherimide), a polyvinylidine fluoride or a polyaryletherketone.

19. A multi-layer composite membrane as claimed in claim 18 wherein the substrate membrane of zirconia.

20. A reverse osmosis process characterised by the use of a membrane as claimed in claim 1.

21. A membrane as claimed in claim 1 wherein said formaldehyde or said precursor also reacts with said free hydroxyl groups to protect said polyol.

22. A process for preparing a reverse osmosis membrane comprising the steps of:
   a) coating the surface of a sulphonated aromatic polyether sulphone support membrane which itself has properties of salt rejection with a solution containing a polyol having free hyroxyl groups and a cross-linking agent comprising one of formaldehyde, a precursor of formaldehyde, and mixtures thereof which are reactive with said free hydroxyl groups, and
   b) drying the resulting coating for a time sufficient for said cross-linking agent to cross-link said polyol.

23. A process as claimed in any claim 22 wherein the polyol is a polymer having repeated units formally derived from a polymerised lower unsaturated alcohol.

24. A process as claimed in claim 23 wherein said polyol is polyvinyl alcohol.

25. A process as claimed in claim 22 wherein the coating solution includes water, a lower alcohol or a mixture thereof as a solvent.

26. A process as claimed in claim 22 including the further step of:
   (c) polymerising said polyol.

27. A process as claimed in claim 22 wherein said formaldehyde or said precursor also is reactive with said free hydroxyl groups to protect said polyol and step (b) is for a time sufficient for said formaldehyde or said precursor to protect said polyol.

\* \* \* \* \*